United States Patent
Most et al.

(10) Patent No.: US 10,125,276 B2
(45) Date of Patent: Nov. 13, 2018

(54) CONTAINER COATING COMPOSITIONS WITH RESISTANCE TO SULFUR STAINING

(71) Applicant: PPG Industries Ohio, Inc., Cleveland, OH (US)

(72) Inventors: Christopher Most, Wilder, KY (US); Robert McVay, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/934,605

(22) Filed: Nov. 6, 2015

(65) Prior Publication Data
US 2017/0130076 A1 May 11, 2017

(51) Int. Cl.
| | | |
|---|---|---|
| *C08F 20/06* | (2006.01) | |
| *C09D 7/61* | (2018.01) | |
| *C08F 220/18* | (2006.01) | |
| *C09D 133/02* | (2006.01) | |
| *C09D 161/06* | (2006.01) | |
| *B65D 1/16* | (2006.01) | |
| *B65D 25/14* | (2006.01) | |
| *C09D 133/08* | (2006.01) | |
| *C09D 5/16* | (2006.01) | |
| *C08K 3/22* | (2006.01) | |

(52) U.S. Cl.
CPC .............. *C09D 7/61* (2018.01); *B65D 1/165* (2013.01); *B65D 25/14* (2013.01); *C08F 220/18* (2013.01); *C09D 5/1618* (2013.01); *C09D 133/02* (2013.01); *C09D 133/08* (2013.01); *C09D 161/06* (2013.01); *C08K 2003/2296* (2013.01)

(58) Field of Classification Search
CPC .......... C08K 2003/2296; C09D 5/1618; C08F 20/06; B65D 1/165; B65D 25/14
See application file for complete search history.

(56) References Cited

U.S. PATENT DOCUMENTS

| | | | |
|---|---|---|---|
| 4,403,005 A | 9/1983 | Nevins et al. | |
| 4,542,053 A | 9/1985 | Nevins et al. | |
| 4,666,982 A * | 5/1987 | McVay | C08F 8/44 525/109 |
| 5,296,525 A * | 3/1994 | Spencer | C08F 299/026 523/407 |
| 6,794,041 B2 | 9/2004 | McVay | |
| 7,475,786 B2 * | 1/2009 | McVay | B65D 25/14 220/62.11 |
| 8,927,652 B2 * | 1/2015 | Most | C08L 33/08 206/524.3 |
| 9,038,849 B2 * | 5/2015 | Most | C08L 33/08 220/626 |
| 2010/0221557 A1 * | 9/2010 | Higuchi | C08J 7/04 428/447 |
| 2014/0050869 A1 * | 2/2014 | Most | C09D 161/06 428/35.7 |
| 2014/0162005 A1 * | 6/2014 | Most | C08L 33/08 428/35.8 |
| 2015/0060472 A1 * | 3/2015 | Most | C08L 33/08 220/626 |
| 2017/0130076 A1 * | 5/2017 | Most | C08F 220/18 |

FOREIGN PATENT DOCUMENTS

EP          0204511 A2    12/1986

* cited by examiner

*Primary Examiner* — Michael A Salvitti
(74) *Attorney, Agent, or Firm* — Diane E. Meyers

(57) ABSTRACT

Coating compositions that have resistance to sulfur staining along with corrosion resistance are disclosed. The coating compositions comprise a blend of:
(a) one or more carboxylic acid group-containing polymers,
(b) a dispersion of zinc oxide in a polysilicone resin.
The coating compositions are typically applied to the internal surface of a steel can.

19 Claims, No Drawings

CONTAINER COATING COMPOSITIONS WITH RESISTANCE TO SULFUR STAINING

FIELD OF THE INVENTION

The present invention relates to container coating compositions, and more particularly to coating compositions for steel containers for foodstuffs that have relatively high sulfur contents.

BACKGROUND OF THE INVENTION

Certain foodstuffs such as corn and peas have relatively high sulfur content compared to other foodstuffs. These foodstuffs, when packed in steel cans including tin-free and tin-plated steel cans have a tendency to stain the inferior surface of the can due to sulfur reaction with iron resulting in a dark iron sulfide stain. This staining, although harmless, gives an undesirable appearance when the can is opened.

It is known that staining can be reduced by incorporating zinc oxide pigment in the coating composition that is applied to the interior surface of the can. Typically the zinc oxide is milled with the resinous vehicle of the coating composition to form a dispersion. However, when the zinc oxide is milled with a carboxylic acid group-containing polymer such as (meth)acrylic polymer for aqueous-based compositions, the resulting dispersion has poor stability in that it gels on storage and can often gel when incorporated into the coating composition.

SUMMARY OF THE INVENTION

The present invention provides a coating composition that has resistance to sulfur staining along with stability. Specifically, the invention provides a coating composition for application to the internal surface of a steel can to retard sulfide staining comprising a blend of:
 (a) one or more carboxylic acid group-containing polymers,
 (b) a dispersion of zinc oxide in a polysilicone resin.

In another embodiment, the invention provides a steel container for foodstuffs capable of causing sulfur staining during sterilization and storage, the container having a coating composition applied to the interior surface of the container; the coating composition comprising a blend of:
 (a) one or more carboxylic acid group-containing polymers,
 (b) a dispersion of zinc oxide in a polysilicone resin containing functional groups reactive with the zinc oxide.

In yet another embodiment, the invention provides a process for preparing a coating composition comprising:
 (a) blending together
   (i) a carboxylic acid group-containing polymer that is at least partially neutralized,
   (ii) a dispersion of zinc oxide in a polysilicone resin containing functional groups reactive with the zinc oxide,
 (b) dispersing the blend of (i) and (ii) in aqueous medium, optionally with an additional neutralizing agent for the carboxylic acid groups.

DETAILED DESCRIPTION

As used herein, unless otherwise expressly specified, all numbers such as those expressing values, ranges, amounts or percentages may be read as if prefaced by the word "about" even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As used herein, the term "polymer" refers broadly to prepolymers, oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_5$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The terms "acrylic polymer" or "(meth)acrylic polymer" refer to polymers prepared from one or more acrylic monomers.

As used herein, the molecular weights are determined by gel permeation chromatography using a polystyrene standard. Unless otherwise indicated, molecular weights are on a number average basis ($M_n$).

The term "package" means anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products.

Packages coated according to the present invention can also include plastic bottles, plastic tubes, laminates and flexible packaging, such as those made from PE, PP, PET and the like. Such packaging could hold, for example, food, toothpaste, personal care products and the like.

The term "food-contacting surface" refers to the surface of a package such as an inner surface of a food or beverage container that is in contact with, or intended for contact with, a food or beverage product. By way of example, an interior surface of a metal substrate of a food or beverage container, or a portion thereof such as a can end or a can body, is a food-contacting surface even if the interior metal surface is coated with a coating composition.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

As used herein, "a", "an", "the", "at least one" and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc,). Furthermore, disclosure of a range includes disclosure of all sub-ranges included within the broader range (e.g., 1 to 5 discloses 1 to 4, 1.5 to 4.5, 4 to 5, etc.).

As indicated, one essential component of the compositions is a carboxylic acid functional polymer containing reactive functional groups (i). Examples of such functional groups are hydroxyl that are reactive with the phenolic compound-formaldehyde reaction product and N-alkoxymethyl groups that are also reactive with the phenolic compound reaction product and with each other. The acid functional polymer can be a polyester or a (meth)acrylic polymer.

Among the monomers used in preparing the (meth)acrylic polymer are ethylenically unsaturated carboxylic acids such as acrylic acid, methacrylic acid, itaconic acid, crotonic acid, and maleic acid.

The ethylenically unsaturated carboxylic acid is used in amounts of 20 to 35 percent, such as 22 to 33 percent by weight based on total weight of monomer used in preparing the (meth)acrylic polymer.

The monomer with the reactive functional group can be selected from hydroxyalkyl esters of (meth)acrylic acid, typically containing 2 to 4 carbon atoms in the hydroxyalkyl group and from N-alkoxymethyl groups derived from (meth)acrylamide containing from 1 to 4 carbon atoms in the N-alkoxy group.

Examples include hydroxyethyl (meth)acrylate and hydroxypropyl (meth)acrylate and monomers of the structure:

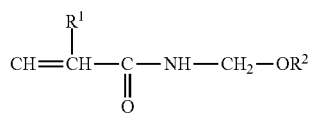

where $R^1$ is hydrogen or methyl and $R^2$ is lower alkyl containing from 1 to 4 carbons. Specific examples of such monomers are N-ethoxymethyl (meth)acrylamide and N-butoxymethyl (meth)acrylamide.

The monomers containing the reactive functional groups are typically present in amounts of 0.2 to 30, such as 5 to 40 percent by weight based on total weight of monomers used in preparing the (meth)acrylic polymer.

Other monomers are usually used in preparing the (meth)acrylic polymer. Examples include aromatic monomers such as styrene and vinyl toluene that are present in amounts of up to 10, such as 35 percent by weight based on total weight of monomers used in preparing the (meth)acrylic polymer; alkyl esters of (meth)acrylic acid containing from 1 to 8 carbon atoms in the alkyl group, such as methyl (meth)acrylate, ethyl (meth)acrylate, butyl (meth)acrylate and 2-ethylhexyl (meth)acrylate that are present in amounts up to 15, such as 45 percent by weight based on total weight of monomers used in preparing the (meth)acrylic polymer.

The (meth)acrylic polymer is formed by free radical polymerization in the presence of a free radical initiator. Examples of initiators are azo compounds, such as, for example, alpha, alpha'-azobis(isobutyronitrile). Other useful initiators are tertiary-butyl perbenzoate, tertiary-butyl pivalate, isopropyl percarbonate, benzoyl peroxide and cumene hydroperoxide.

The (meth)acrylic polymer typically has a number average molecular weight of 3,000 to 20,000, as determined by gel permeation chromatography using a polystyrene standard.

The carboxylic acid functional polymer containing functional groups (i) is usually present in the composition in amounts of 15 to 35, such as 20 to 30 percent by weight based on weight of resin solids in the coating composition. Amounts less than 15 percent by weight do not provide stable dispersions, whereas amounts greater than 35 percent by weight result in blistering of the film upon baking.

Typically curing agents are present in the composition, which are reactive with the functional groups of the carboxylic acid group-containing polymer and that may be self-reactive. Suitable curing agents are phenolplasts or phenol-formaldehyde resins and aminoplast or triazine-formaldehyde resins. The phenol-formaldehyde resins are preferably of the resol type. Examples of suitable phenols are phenol itself, butyl phenol, xylenol and cresol. Cresol-formaldehyde resins, typically etherified with butanol, are often used. For the chemistry in preparation of phenolic resins, reference is made to "The Chemistry and Application of Phenolic Resins or Phenolplasts", Vol. V. Part I, edited by Dr. Oldring: John Wiley & Sons/Cita Technology Limited, London, 1997. Examples of commercially available phenolic resins are PHENODUR® PR285 and BR612 and those resins sold under the trademark BAKELITE®, typically BAKELITE 6581LB.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Allenex AB.

The curing agent is typically present in the composition in an amount of 40 to 70, such as 45 to 60 percent by weight based on weight of resin solids in the composition.

As mentioned above, the zinc oxide is dispersed in a polysilicone resin. Typically, the zinc oxide is dispersed in a solution of a polysilicone resin, typically an alcohol such as n-butanol, by a grinding process to a particle size of less than 15 microns, such as 10 to 15 microns on a Hegman gauge by the usual techniques such as ball milling or by Cowles dispersing.

The silicone resins that are used in the practice of the invention typically are functional silicone resins, that is, they contain functional groups such as hydroxyl groups that are reactive with the zinc oxide. These groups are also reactive with functional groups associated with the curing or cross-linking agent of the resinous binder such as aminoplast or phenolplast. Also, the silicone resins can be phenylated silicone resins containing a $C_6H_5$—Si≡ bond. The phenyl group is beneficial in that it compatibilizes the silicone resin with the other resinous ingredients in the coating composition in that all of the resinous ingredients can be uniformly dissolved or dispersed in a diluent, that is, the silicone resin will not form a separate phase from the other resinous ingredients in the coating composition.

The phenylated silicone resin used in the composition according to the invention is advantageously an alkyl-phenyl silesquioxane resin.

This resin advantageously comprises units of the following formulae:

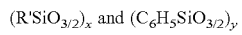
$(R'SiO_{3/2})_x$ and $(C_6H_5SiO_{3/2})_y$.

R' is selected from the group consisting of a linear or branched alkyl group comprising from 1 to 20 carbon atoms, such as from 2 to 8 carbon atoms, a cycloalkyl group comprising from 5 to 20 carbon atoms, such as from 6 to 12 carbon atoms, and a hydroxyl group, and x and y independently ranging from 0.05 to 0.95, such that x is 0.1 to 0.3 and y is 0.7 to 0.9, and x+y=1.

x and y representing the mole fraction of the siloxane units $(R'SiO_{3/2})_x$ and $(C_6H_5SiO_{3/2})_y$, with respect to the total number of moles of siloxane units in the phenylated silicone resin.

Usually R' is a mixed alkyl group and hydroxyl group such that the silicone resin has a hydroxyl content of 3 to 20, such as 5 to 10 percent by weight based on solid weight of the silicone resin.

The phenylated silicone resin advantageously comprises at least 20 mole percent, preferably at least 30 mole percent, better still at 40 mole percent, even better still at least 50 mole percent and better still at least 60 mole percent of siloxane units $(R'SiO_{3/2})_x$ and $(C_6H_5SiO_{3/2})_y$, with respect to the total number of siloxane units present in the phenylated silicone resin.

According to one embodiment, the content of siloxane units $(R'SiO_{3/2})_x$ and $(C_6H_5SiO_{3/2})_y$, can range up to 100 mole percent, with respect to the total number of siloxane units present in the phenylated silicone resin.

Examples of alkyl groups are methyl, ethyl and propyl; examples of cycloalkyl groups are cyclohexyl.

The alkyl-phenyl silesquioxane resins can contain additional siloxy units such as (i) $(R^1{}_3SiO_{1/2})_a$, (ii) $(R^2{}_2SiO_{2/2})_b$, (iii) $(R^3SiO_{3/2})_c$, or (iv) $(SiO_{4/2})_d$ units. The amount of each unit present in the alkylphenyl silesquioxane resin can be expressed as a mole fraction of the total number of moles of all siloxy units present in the alkyl-phenyl silesquioxane resin. Thus, the alkyl-phenyl silesquioxane resins of the present invention comprise the units:

$(R^1{}_3SiO_{1/2})_a$ (i)

$(R^2{}_2SiO_{2/2})_b$ (ii)

$(R^3SiO_{3/2})_c$ (iii)

$(SiO_{4/2})_d$ (iv)

$(R'SiO_{3/2})_x$ and (v)

$(C_6H_5SiO_{3/2})_y$ (vi)

wherein
R' is defined above,
$R^1$, $R^2$ and $R^3$ are independently an alkyl group having from 1 to 8 carbon atoms such as methyl, ethyl and propyl; an aryl group such as phenyl and tolyl, a hydroxyl group, a carbinol group or an amino group,
a, b, c and d have a value of zero to 0.4,
x and y have a value of 0.05 to 0.95, such as x having a value of 0.1 to 0.3 and y having a value of 0.7 to 0.9, with the provisos that the value of x+y is equal to or greater than 0.60, and the value of a+b+c+d+x+y=1.

The zinc oxide dispersion usually contains about 25 to 40, such as 28 to 34 percent by weight zinc oxide based on total weight of the zinc oxide and polysilicone resin. The dispersion is incorporated in the composition in amounts sufficient to provide 0.5 to 10, such as 1 to 5 percent by weight zinc oxide based on total weight of the coating composition, and 2 to 25, such as 5 to 20 percent by weight polysilicone resin based on weight of resin solids.

Adjuvant resins such as polyester polyols, polyether polyols and polyurethane polyols may be included in the coating compositions to maximize certain properties of the resultant coating. When present, the adjuvant resin is used in amounts of up to 50, typically 2 to 50 percent by weight based on weight of resin solids of the coating composition.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphonic acid.

Another useful optional ingredient is a lubricant for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

In certain embodiments, the compositions used in the practice of the invention are substantially free, may be essentially free, and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above-mentioned compounds, derivatives or residues thereof.

The compositions of the present invention can be prepared according to methods well known in the art. For example, the carboxylic acid functional polymer is neutralized with an amine to between 20 to 80 percent of the total theoretical neutralization. The neutralized acrylic polymer is then dispersed in water followed by the addition of the zinc oxide dispersion and optionally additional neutralizing agent. The mixture can then be thinned with more water to achieve a manageable viscosity. Crosslinkers and additives are then added followed by thinning with additional water to achieve the desired solids and viscosity.

As mentioned above, the coating compositions of the present invention can be applied to containers of all sorts and are particularly well adapted for use on food and beverage cans (e.g., two-piece cans, three-piece cans, etc.) that are fabricated from steel including tin-free steel and tin-plated steel. These containers are used to store sulfur-containing foodstuffs such as peas, corn and pet food.

The compositions can be applied to the food or beverage container by any means known in the art such as roll coating, spraying and electrocoating. It will be appreciated that for two-piece food cans, the coating will typically be sprayed after the can is made. For three-piece food cans, a flat sheet will typically be roll coated with one or more of the present compositions first and then the can will be formed. As noted above, the percent solids of the composition can be adjusted based upon the means of application. The coating can be applied to a dry film weight of 2 mgs/in$^2$ to 8 mgs/in$^2$, such as 4.5 mgs/in$^2$ to 6 mgs/in$^2$.

After application, the coating is then cured. Cure is effected by methods standard in the art. For coil coating, this is typically a short dwell time (i.e., 9 seconds to 2 minutes) at high heat (i.e., 485° F. (252° C.) peak metal temperature); coated metal sheets typically cure longer (i.e., 10 minutes) but at lower temperatures (i.e., 400° F. (204° C.) peak metal temperature). For spray applied coatings on two-piece cans, the cure can be from 5 to 8 minutes, with a 90-second bake at a peak metal temperature of 415° F. (213° C.) to 425° F. (218° C.).

The compositions of the present invention perform as desired both in the areas of reduced sulfur staining and corrosion resistance.

EXAMPLES

The following examples are offered to aid in understanding of the present invention and am not to be construed as limiting the scope thereof. Unless otherwise indicated, all parts and percentages are by weight.

The Examples show the preparation of three (3) coating compositions. The compositions were aqueous-based and were formulated with amine-solubilized carboxylic acid-containing (meth)acrylic polymer and phenolplast curing agent. Two of the compositions contained a dispersion of zinc oxide in a polysilicone resin and one composition did not contain the zinc oxide dispersion. The compositions were spray applied to the interior surface of a steel can; the cans filled with a pet food that produces surface staining. The filled cans were sealed and retorted for 90 minutes at 250° F. (121° C.). The cans were then evaluated for sulfur staining.

Example A

A (meth)acrylic polymer was prepared by free radical polymerization in 2-butoxyethanol from the following monomer mixture: 20 percent by weight methacrylic acid, 25 percent by weight styrene, 50 percent by weight butyl acrylate and 5 percent by weight N-butoxymethylol acrylamide; the percentages by weight being based on total weight of monomers. The resulting polymer had an $M_n$ of 3495 and a theoretical solids content of 52 percent by weight in 2-butoxyethanol.

Example B

An aqueous dispersion of a (meth)acrylic polymer was prepared by first preparing a (meth)acrylic polymer by free radical polymerization in n-butanol from the following monomer mixture: 30 percent by weight methacrylic acid, 25 percent by weight styrene, 43 percent by weight butyl acrylate and 2 percent by weight N-butoxymethylol acrylamide; the percentages by weight being based on total weight of monomers. The resulting polymer had an $M_n$ of 10,600 and a theoretical solids content of 52 percent by weight in butanol. The polymer was partially neutralized (30 percent of the total theoretical neutralization) with dimethylethanolamine and dispersed in water at a theoretical solids content of 43.5 percent by weight.

Example C

A zinc oxide dispersion was prepared by grinding zinc oxide in polysilicone resin solution (Dow Corning's RSN-0255) dissolved in n-butanol. The dispersion had the following weight ratio: 32% ZnO/42% polysilicone/26% n-butanol.

Example 1 (Comparative)

A coating composition was prepared from the following mixture of ingredients:

| Raw Material | Amount (gm) | Wt. % |
| --- | --- | --- |
| (Meth)Acrylic Resin of Example A | 300.00 | 7.89 |
| (Meth)Acrylic Resin of Example B | 425.00 | 11.18 |
| Dimethylethanolamine | 41.00 | 1.08 |
| Phenolic Resin A[1] | 800.00 | 21.05 |
| Phenolic Resin B[2] | 0.00 | 0.00 |
| Polyamide Resin[3] | 150.00 | 3.95 |
| Epoxidized Polybutadiene[4] | 15.00 | 0.39 |
| ZnO-Silicone Resin Dispersion of Example C | 0.00 | 0.00 |
| Caprylic Acid | 25.00 | 0.66 |
| n-Butanol | 100.00 | 2.63 |
| Deionized water | 1944.00 | 51.16 |

[1]Phenolic Resin A is a cresol-formaldehyde resin available from Allnex Resins as PR-516.
[2]Phenolic Resin B is a t-butyl phenol-formaldehyde resin available from Durez Corp. as 29-401.
[3]Polyamide Resin is from Bitrez Polymers and Chemicals as Aramine 30-115X70.
[4]Epoxidized Polybutadiene is from Cray Valley as Poly BD 605e.

Example 2

A coating composition was prepared from the following mixture of ingredients:

| Raw Material | Amount (gm) | Wt. % |
|---|---|---|
| (Meth)Acrylic Resin of Example A | 300.00 | 7.89 |
| (Meth)Acrylic Resin of Example B | 700.00 | 18.42 |
| Dimethylethanolamine | 58.70 | 1.54 |
| Phenolic Resin A | 100.00 | 2.63 |
| Phenolic Resin B | 715.00 | 18.82 |
| Polyamide Resin of Example 1 | 150.00 | 3.95 |
| Epoxidized Polybutadiene of Example 1 | 15.00 | 0.39 |
| ZnO-Silicone Resin Dispersion of Example C | 110.00 | 2.89 |
| Caprylic Acid | 25.00 | 0.66 |
| n-Butanol | 100.00 | 2.63 |
| Deionized water | 1526.30 | 40.17 |

Example 3

A coating composition was prepared from the following mixture of ingredients:

| Raw Material | Amount (gm) | Wt. % |
|---|---|---|
| (Meth)Acrylic Resin of Example A | 425.00 | 11.18 |
| (Meth)Acrylic Resin of Example B | 910.00 | 23.95 |
| Dimethylethanolamine | 78.00 | 2.05 |
| Phenolic Resin A | 425.00 | 11.18 |
| Phenolic Resin B | 155.00 | 4.08 |
| Polyamide Resin of Example 1 | 150.00 | 3.95 |
| Epoxidized Polybutadiene of Example 1 | 15.00 | 0.39 |
| ZnO-Silicone Resin Dispersion of Example C | 110.00 | 2.89 |
| Caprylic Acid | 25.00 | 0.66 |
| n-Butanol | 100.00 | 2.63 |
| Deionized water | 1407.00 | 37.03 |

Coating Preparation:

The coatings were prepared by combining Acrylic A & Acrylic B with dimethylethanolamine (DMEA) under high shear (Cowles mixer) in a stainless steel mixing vessel. The phenolic resin(s) were added before a stable dispersion is prepared by adding water. The ZnO-silicone dispersion and the remaining ingredients were added in the order indicated. Additional water is added as needed to adjust viscosity to 24" (Ford-4).

Coating Application:

The coatings were applied to the interior of steel cans via a high pressure airless spray gun (at 800 psi and 95 milliseconds) in order to achieve a film weight of 280 mgs to 300 mgs.

Pack Testing:

For each coating, three (3) cans were pack tested in Pedigree Puppy Lamb with Rice, a known aggressive pet food with regards to staining due to high sulfur content. The pet food was purchased from the marketplace, emptied into a large steel cooking pot and heated to 160-180° F. (71-82° C.). Hot pet food was transferred into coated cans leaving 4/16 inch of headspace. Ends are seamed onto the cans and they are placed upside-down into a steam retort. The cans are retorted for 90 minutes at 250° F. (121° C.) and 16 psi. The nine (9) cans are removed from the retort and cooled to ambient temperature while still oriented upside-down. After cooling, the cans are turned right-side-up and stored in a 120° F. (49° C.) hot room. Cans are removed after four weeks, opened, cleaned and evaluated for staining. The cleaned cans were opened by cutting four equally spaced vertical cuts along the side-wall; the four side wall sections are then flattened. The areas containing sulfide staining is measured. The results are reported as percentage of total surface area that is unstained as shown in the Table below.

TABLE

| | (% of Surface Not Stained) | | | |
|---|---|---|---|---|
| Coating Example | Can 1 | Can 2 | Can 3 | Average |
| 1 | 85 | 87 | 75 | 82 |
| 2 | 90 | 93 | 91 | 91 |
| 3 | 91 | 93 | 90 | 91 |

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

What is claimed is:

1. A coating composition for application to the internal surface of a steel can to retard sulfide staining comprising a mixture of the following separate ingredients:
   (a) one or more polymers containing functional groups including carboxylic acid groups,
   (b) zinc oxide predispersed in a polysilicone resin.

2. The coating composition of claim 1 in which the carboxylic acid groups of the polymer are at least partially neutralized and (a) and (b) are dispersed in aqueous medium.

3. The coating composition of claim 1 in which the polymer is a (meth)acrylic polymer.

4. The coating composition of claim 1 in which the polysilicone resin has hydroxyl groups.

5. The coating composition of claim 1 in which the dispersion of (b) contains from 25 to 40 percent zinc oxide based on total weight of the zinc oxide and polysilicone resin.

6. The coating composition of claim 1 which contains a third separate ingredient that is a curing agent that is reactive with functional groups of the polymer.

7. The coating composition of claim 6 in which the functional groups include N-butoxymethylol (meth)acrylamide.

8. The coating composition of claim 6 in which the curing agent is a phenolplast.

9. The coating composition of claim 1 in which
   (a) the one or more polymers are present in amounts of 15 to 35 percent by weight,
   (b) the polysilicone resin is present in amounts of 5 to 20 percent by weight;
   the percentages by weight being based on total weight of resin solids.

10. The coating composition of claim 1 in which the zinc oxide is present in amounts of 1 to 5 percent by weight based on total weight of the coating composition.

11. The coating composition of claim 6 in which the curing agent is present in amounts of 40 to 70 percent by weight based on weight of resin solids.

12. A steel container for foodstuffs capable of causing sulfur staining during sterilization and storage, the container having a coating composition applied to the interior surface of the container; the coating composition comprising a mixture of the following separate ingredients:
- (a) one or more polymers containing functional groups including carboxylic acid groups,
- (b) zinc oxide predispersed in a polysilicone resin containing functional groups reactive with the zinc oxide.

13. The steel container of claim 12 in which the coating composition is heated to form a cured coating.

14. The steel container of claim 13 wherein the cured coating is present on the interior surface of the container from 4.5 to 6.0 milligrams per square inch of surface.

15. A process for preparing a coating composition comprising:
- (a) mixing together the following separate ingredients:
  - (i) one or more polymers containing functional groups including carboxylic acid groups that are at least partially neutralized,
  - (ii) zinc oxide predispersed in a polysilicone resin containing functional groups reactive with the zinc oxide,
- (b) dispersing the mixture of (i) and (ii) in aqueous medium, optionally with an additional neutralizing agent for the carboxylic acid groups.

16. The process of claim 15 in which the mixing step (a) additionally comprises a third separate ingredient that is a curing agent.

17. The process of claim 15 in which
- (a) the polymer is present in amounts of 15 to 35 percent by weight,
- (b) the polysilicone resin is present in amounts of 5 to 20 percent by weight;

the percentages being based on total weight of resin solids.

18. The process of claim 15 in which the zinc oxide is present in amounts of 1 to 5 percent by weight based on total weight of the coating composition.

19. The process of claim 16 in which the curing agent is present in amounts of 40 to 70 percent by weight based on weight of resin solids.

* * * * *

UNITED STATES PATENT AND TRADEMARK OFFICE
CERTIFICATE OF CORRECTION

PATENT NO. : 10,125,276 B2
APPLICATION NO. : 14/934605
DATED : November 13, 2018
INVENTOR(S) : Robert L. McVay and Christopher Most Page 1 of 1

It is certified that error appears in the above-identified patent and that said Letters Patent is hereby corrected as shown below:

In the Claims

In Column 10, Line 48 - 49, Claim 7, replace "N-butoxymethylol (meth)acrylamide" with "N-butoxymethyl (meth)acrylamide"

Signed and Sealed this
Thirty-first Day of March, 2020

Andrei Iancu
*Director of the United States Patent and Trademark Office*